United States Patent

[11] 3,579,860

| | | | | |
|---|---|---|---|---|
| [72] | Inventor | Lawrence F. Strem<br>810 Valley View Drive, La Vale, Md. 21502 | | |
| [21] | Appl. No. | 814,998 | | |
| [22] | Filed | Apr. 10, 1969 | | |
| [45] | Patented | May 25, 1971 | | |

[54] VISUAL AID FOR TEACHING AND TESTING THE SIGHT READING OF THE FRACTIONAL DIVISIONS OF AN INCH
3 Claims, 1 Drawing Fig.

[52] U.S. Cl. ................................................ 35/31
[51] Int. Cl. ........................................ G09b 19/00
[50] Field of Search .......................... 35/31, 31.5, 31.3, 35, 32

[56] References Cited
UNITED STATES PATENTS

| | | | |
|---|---|---|---|
| 2,389,394 | 11/1945 | Thomas.......................... | 35/31UX |
| 3,277,590 | 10/1966 | Zimmerman................... | 35/35 |
| 3,402,482 | 9/1968 | Rankin........................... | 35/31(.5) |

*Primary Examiner*—Wm. H. Grieb
*Attorney*—Colton and Stone

ABSTRACT: A visual aid for teaching and testing sight reading of the fractional divisions of a unit of measure which includes a plurality of selectively energizable indicators associated with an enlarged scale reproduction of the unit of measure.

PATENTED MAY 25 1971
3,579,860
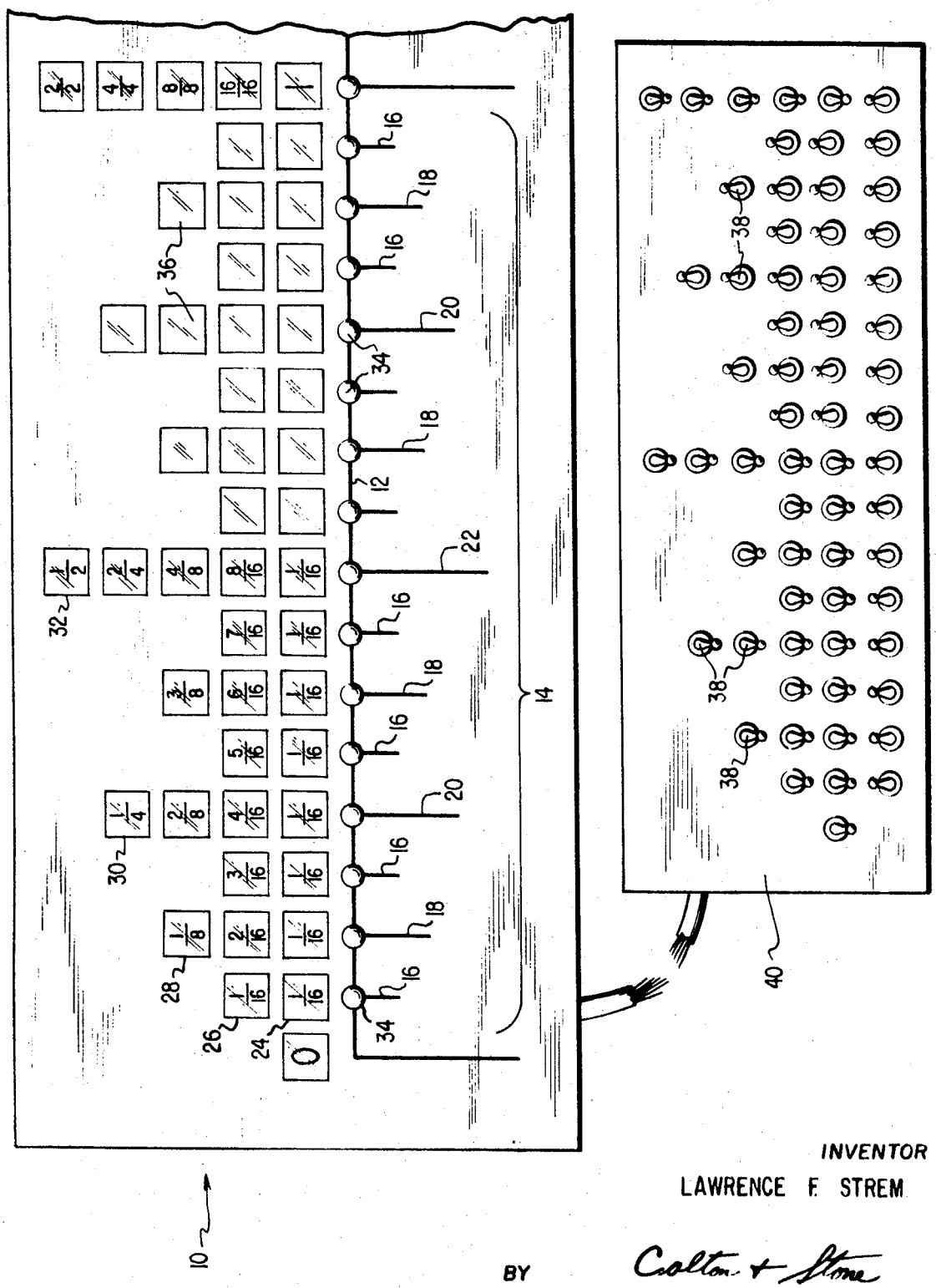
INVENTOR
LAWRENCE F. STREM
BY Colton + Stone
ATTORNEYS

3,579,860

VISUAL AID FOR TEACHING AND TESTING THE SIGHT READING OF THE FRACTIONAL DIVISIONS OF AN INCH

The invention relates to a visual aid fashioned in the form of a selectively illuminable display board or panel depicting, on a greatly enlarged scale, a typical unit of linear measurement and its fractional divisions. The visual aid is adapted, primarily, to facilitate instruction in the sight reading of fractional divisions of conventional unit of measurement and, secondarily, as a means of reinforcing a foreground knowledge of fractions, fractional equivalents and their arithmetic manipulation.

Although most children receive some basic instruction in the use of a conventional rule at either the early grammar or preschool level, the retention of such instruction tends to be limited to the recognition of the basic units such as inches or centimeters which are readily recognizable by their associated arabic numerals. As the use of a rule in normal classroom work continues through the upper grammar school level, the child comes to recognize, and in many cases learns to sight read, the basic divisions of an inch such as the fourth and half inch which is greatly facilitated by the longer vertical division lines used to indicate these major and frequently used fractional divisions. The remaining subdivisions of a conventional rule, eighths and sixteenths are frequently but dimly perceived by the child and, if understood at all, usually require counting of these smaller individual subdivisional markings to measure a given length which must be expressed in eighths or sixteenths. Indeed, many adults resort to counting the individual sixteenth markings of a rule, frequently by touch with a pencil point, to measure fractional portions of an inch expressible in sixteenths.

In certain trades and skills, such as mechanical drafting and the like where the usage frequency of a rule is very high, the ability to sight read all the conventional subdivisions of a rule is critical and this ability must be mastered early by a beginning student of such crafts. The student is normally first faced with the problem of learning to sight read a conventional rule at an early stage of his junior high or high school education when he undertakes a course in mechanical drawing. At this stage in his education, the student usually understands the fractional subdivisions of a rule, can sight read the half and perhaps the fourth subdivisions, has learned basic fractions and been exposed to their basic arithmetic manipulation including the conversion of fractions to a least common denominator.

The primary object of the present invention is to provide a visual display that will assist the instruction of students in learning to sight read all the fractional divisions of an inch.

A further object is to provide a convenient and time saving method of simultaneously testing the students' ability to sight read the divisional markings.

An ancillary, but no less important object, is to reinforce the students' knowledge of basic fractions, their relationship to one another and their arithmetic manipulation.

Basically, the foregoing objectives are achieved by the association of a plurality of indicators, herein illustrated as selectively operable lights individually in circuit with an instructor's control panel, associated with each of the divisional markings of an inch which are depicted to an enlarged scale on a display board positioned at the front of a classroom. Certain of the indicators have indicium associated therewith which are not visible to the student until the instructor activates a light associated with a particular indicium from a remote control panel.

A first group of 15 indicators are associated with each of the 15 marked divisions of an inch representing 16 equal spacings and each indicator carries the indicium 1/16. A second group of 15 indicators is also associated with each of the marked divisions whose indicium increase from 1/16 at the first subdivision on the left to 15/16 at the extreme rightmost subdivision. Third and fourth groups of indicators consisting of seven and three indicators, respectively, are associated with the eighths and fourths divisional markings and bear the respective indicium of 1/8, 2/8, 3/8, 4/8, 5/8, 6/8, 7/8 and 1/4, 2/4, 3/4. One additional indicator bearing the indicium 1/2 is associated with the half divisional marking.

The indicium bearing indicators may be selectively activated by an instructor to make visible the indicium associated therewith for the purpose of simultaneously instructing a classroom of pupils in the sight reading of a rule in a manner which will become more apparent from the ensuing discussion.

A sixth group of indicators, which are not provided with indicium and may be selectively activated by an instructor, are associated with each divisional marking for the purpose of indicating to the student which marking or markings are to be sight read, as for testing purposes.

A complete understanding of the foregoing general statements of function and advantages will be had from the following detailed description of one specific embodiment of the invention when considered in conjunction with the accompanying drawing wherein:

The single FIGURE depicts a front elevation of a visual aid display and associated control panel construction in accordance with the present invention.

Referring to the FIGURE, a display board 10 is illustrated as having depicted thereon an enlarged scale of the divisional markings of an inch as applied to a conventional rule.

A horizontal base line 12, representing the straightedge of the rule, has extending therefrom 15 equispaced parallel divisional markings or lines 14 representing the 16 conventional divisions of an inch. As in a conventional rule, the eight lines 16 representing those sixteenth fractional divisions having an odd number in the numerator have a lesser linear length than the remaining divisional markings. Similarly, the four lines 18 representing the 1/8, 3/8, 5/8 and 7/8 subdivision markings are shorter than those two lines 20 representing the 1/4 and 3/4 divisional markings which are, in turn, shorter than the ½-inch line represented at 22.

A first group of 15 indicators 24 bearing the indicium 1/16 are associated with each divisional marking. A second group of 15 indicators 26 are positioned above each indicator 24 which second group indicate the addition of each divisional marking and, accordingly, increase in value from 1/16 at the leftmost marking to 15/16 at the right-hand end of the base line.

A third row of horizontal indicators 28 are positioned vertically above the lower two indicators in association with each division line 18 and 20 and, reading from left to right, bear the respective indicium of 1/8, 2/8, 3/8, 4/8, 5/8, 6/8, 7/8.

Similarly, indicators 30, 32 bearing the indicium 1/4, 2/4, 3/4, and 1/2, respectively, are associated with the divisional markings 20 and 22.

A plurality of testing indicators 34 are positioned on base line 12 at the intersection thereof with each divisional marking 14. Indicators 34 bear indicium.

Each of the indicators 24, 26, 28, 30, 32 and 34 comprise a glass panel 36 having a light source, not shown, such as a bulb or the like positioned therebehind which are adapted to be individually selectively energized by an appropriate one of the switches 38 at an appropriately positioned instructors' control panel 40. The 0 and 1 numerals which are shown at either end of the scale enlargement as well as the fractional equivalents of the numeral 1 which are associated therewith in the same manner as the fractional equivalents associated with the ½-inch marking may, also, be illuminated and controlled by appropriate switches on panel 40. The indicium associated with the various indicators including indicators 24—32 are not visible when the associated light source is deenergized and are rendered visible by the lighting thereof. This may be effected in any desired manner such as by imprinting the indicium on the surface of panels 36 remote from the viewer and adjacent the light source. For the purpose of better illustrating the various indicium associated with each divisional marking, the indicators associated with the ½-inch divisional marking and those to the left thereof are shown in the drawing as being energized while those to the right of line 22, except for the 1-inch marking, are illustrated as being deenergized whereby the indicium are not visible.

Initial instruction is normally commenced by serially energizing indicators 24, commencing with the 1/16 divisional marking, and continuing through the 15/16 marking, to reinforce the fact that each divisional marking, irrespective of its length, represents one sixteenth of an inch. After this concept is grasped, indicators 26 may be serially or randomly energized. Serial energization reinforces the first learned concept of the divisional markings, each, representing one sixteenth of an inch and, additionally, creates an association in the mind of the student between the particular indicium and the length and relative position of the divisional markings associated therewith. After the student has become more or less familiar with the position and values of indicators 26 in relation to the divisional markings, these indicators may then be energized in a random fashion so that the student begins to associate the particular fractional value more with its relative position on the scale than with its relative position to another lighted indicator, which he would be able to read. For example, with all other indicators deenergized, if the 3/16 indicium is illuminated, the student will associate this value more strongly in relation to the relative lengths and positions of the adjoining and longer divisional markings 18 and 20 than would be the case were he able to read the indicium associated with these longer markings.

The purpose of indicators 28, 30 and 32 is not only to teach the fractional equivalents, reduced to lesser common denominators, of the sixteenth divisional markings but also to take advantage of the fact that the student is quite probably already able to sight read the fourth and half divisional markings and to take advantage of this fact by quickly drawing his attention to these known fractions for more ready association with the lesser, or unknown, adjacent divisional markings.

It will, of course, be apparent that as the student learns the various equivalent fractional values assigned to a common marking his basic knowledge of fractions and their reduction to least common denominators will be reinforced.

After the student has begun to master the foregoing, the instructor may energize a plurality of the indicators for the purpose of teaching the student to add and/or subtract the various values. This, of course, greatly reinforces the basic sight reading concept since, if the lights are flashed fairly rapidly, it becomes essential for the student to be able to sight read the markings in order to arrive at the correct answer before he forgets the multiple fractions which were illuminated. The indicators 34, which are not provided with indicium, may be used for testing purposes such as by momentarily flashing individual ones of the lights at a sufficiently rapid rate that the student must be able to sight read the divisional markings in order to record the correct answers on a test sheet. When indicators 34 are flashed at a slower rate than that normally used for testing purposes, they serve a function analogous to that previously described in connection with the multiple flashing of the indicium bearing indicators, i.e. as an instruction aid. Thus, in this latter connection, one or a plurality of indicators 34 may be flashed and after allowing a moment for the student to sight read the marking or markings so illuminated, the correct answer is flashed by energization of one of the indicium bearing indicators associated with the same marking or markings.

I claim:

1. A visual aid for the teaching and testing of sight reading and arithmetic manipulation involving the fractional portions of an inch based on the indicia employed with a conventional rule, comprising; a display panel including a plurality of parallel, equally spaced vertical division lines extending in a common direction from a horizontal base line, a first plurality of said vertical lines having a common length and each adjacent pair thereof being separated by a second plurality of said vertical lines having greater lengths than said first plurality of lines; a first plurality of indicators bearing a common first indicium associated with each of said vertical lines; a second plurality of indicators associated with each of said vertical lines bearing second indicium differing from each adjacent pair of said second indicium by the fractional portion of an inch represented by each of the first named spaced vertical division lines; a control station; and means operable from said control station for selectively, individually controlling said indicators.

2. A visual aid as defined in claim 1 including a first plurality of testing indicators associated with each of said vertical lines.

3. A visual aid as defined in claim 2 including third and fourth plurality of indicium bearing indicators associated, respectively, with seven of said vertical lines and three of said vertical lines, and said seven lines having a common length less than the length of said three lines.

UNITED STATES PATENT OFFICE
CERTIFICATE OF CORRECTION

Patent No. 3,579,860    Dated  May 25, 1971

Inventor(s)  Lawrence F. Strem

It is certified that error appears in the above-identified patent and that said Letters Patent are hereby corrected as shown below:

Col. 2, line 55: Change "bear indicium" to --bear no indicium--.

Signed and sealed this 17th day of August 1971.

(SEAL)
Attest:

EDWARD M. FLETCHER, JR.　　　　　WILLIAM E. SCHUYLER, JR.
Attesting Officer　　　　　　　　Commissioner of Patents